United States Patent
Janke et al.

(10) Patent No.: US 8,673,089 B2
(45) Date of Patent: Mar. 18, 2014

(54) ALDIMINE CLEANING COMPOSITION FOR REACTIVE POLYURETHANE COMPOSITIONS

(75) Inventors: Doreen Janke, Alveslohe (DE); Kai Paschkowski, Jork (DE)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/513,466

(22) PCT Filed: Nov. 26, 2010

(86) PCT No.: PCT/EP2010/068267
§ 371 (c)(1),
(2), (4) Date: Jun. 1, 2012

(87) PCT Pub. No.: WO2011/067168
PCT Pub. Date: Jun. 9, 2011

(65) Prior Publication Data
US 2012/0245069 A1   Sep. 27, 2012

(30) Foreign Application Priority Data
Dec. 2, 2009   (EP) .................................... 09177687

(51) Int. Cl.
*B08B 9/027* (2006.01)
*C11D 3/26* (2006.01)
*C11D 7/32* (2006.01)

(52) U.S. Cl.
USPC .......... 134/22.14; 134/22.19; 134/39; 134/42; 510/188; 510/499

(58) Field of Classification Search
USPC .......... 510/188, 499; 134/22.14, 22.19, 39, 42
See application file for complete search history.

(56) References Cited

U.S. PATENT DOCUMENTS

| 5,348,680 A | 9/1994 | Maitz |
| 5,772,790 A | 6/1998 | Huber |
| 2006/0149025 A1* | 7/2006 | Burckhardt .................. 528/230 |
| 2010/0101455 A1* | 4/2010 | Burckhardt ................ 106/287.3 |

FOREIGN PATENT DOCUMENTS

| EP | 0 544 058 A2 | 6/1993 |
| EP | 1 384 709 A1 | 1/2004 |
| EP | 1 535 990 A1 | 6/2005 |
| EP | 2 017 260 A1 | 1/2009 |
| WO | WO 2005/052104 A1 | 6/2005 |

OTHER PUBLICATIONS

Sep. 7, 2011 International Preliminary Report on Patentability issued in International Patent Application No. PCT/EP2010/068267 (with translation).
International Search Report issued in International Application No. PCT/EP2010/068267 dated Sep. 7, 2011.

\* cited by examiner

*Primary Examiner* — Brian P Mruk
(74) *Attorney, Agent, or Firm* — Oliff PLC

(57) ABSTRACT

Methods of using an aldimine of formula (I) as cleaning agent or ingredient of a cleaning agent composition for reactive polyurethane compositions, especially for reactive polyurethane hot melt adhesives. It has been found that such cleaning agents can greatly reduce the quantity of wastes and in particular mixtures of blocked and nonblocked reactive polyurethane compositions can be used without problem for gluing, without the gluing being negatively influenced in its properties, especially its thermal stability.

11 Claims, No Drawings

ALDIMINE CLEANING COMPOSITION FOR REACTIVE POLYURETHANE COMPOSITIONS

TECHNICAL FIELD

The present invention concerns cleaning agents for the cleaning of production and processing plants for reactive polyurethane compositions, especially reactive polyurethane hot melt adhesives.

PRIOR ART

During the processing of reactive polyurethane compositions in general, and reactive polyurethane hot melt adhesives in particular, hardened adhesive particles steadily appear over time, due to the reactivity with water, especially in the form of humidity, and these have a deleterious impact on the quality and the application. Therefore, a regular cleaning of the tools and equipment is needed. However, a manual cleaning very time-consuming, labor-intensive, and very costly, since it usually requires a dismantling of the apparatus. Another difficulty in processing involves interruptions in the operation, such as short-term malfunctions or longer standstill over night or over the weekend. In these instances, the polyurethane composition remains motionless in the plant and hardened deposits can occur at surfaces, especially on moving parts or nozzles of the machines. This is especially critical where the adhesive comes in contact with the air of the surroundings.

For this reason, there is a need to provide an alternative to the time-consuming manual cleaning. Cleaning pastes have been proposed, but because of the abrasive ingredients contained in them they greatly damage the plants and therefore do not constitute a real alternative. EP 0 544 058 A2 discloses a cleaning agent composition that contains a monofunctional alcohol, in addition to a non-isocyanate reactive polyurethane mass.

Furthermore, U.S. Pat. No. 5,772,790 discloses a cleaning agent composition which contains a monofunctional amine, in addition to a nonhardening polyurethane prepolymer. But amines are problematical for labor hygiene and toxic to the environment, since amines have a corrosive action. In particular, the preferred fatty amines are a problem, since in the case of an unintentional contact with the eyes, as during an accident, they are extremely difficult to remove on account of their surfactant nature, especially before the corrosive action sets in. Furthermore, working with low molecular amines always involves the production of an unpleasant odor.

WO 2005/052104 A1 discloses a cleaning composition based on an amide or a monofunctional imide.

All these approaches of the prior art are based on an irreversible blocking of the reactive polyurethane composition and have the major drawback that after the cleaning one has to completely remove the polyurethane composition blocked by the cleaning agent in order to prevent adhesive problems, especially in regard to the thermal stability of the gluing. In order to prevent such problems, on the one hand a process control system has to be provided and, on the other hand, the blocked polyurethane composition has to be almost completely ejected by new reactive polyurethane composition before resumption of operation, so that one has to dispose of not only the thus blocked polyurethane composition but also the mixed fractions with new reactive polyurethane composition. The amount of adhesive to be disposed of can be substantial, depending on the cleaning agent and equipment, which is of course a very great drawback in terms of economy and ecology.

Presentation of the Invention

The problem of the present invention is therefore to provide a cleaning agent composition for the cleaning of manufacturing and processing plants for reactive polyurethane compositions that enables a cleaning in which the polyurethane composition blocked by the cleaning agent composition does not have to be completely disposed of, but instead mixed fractions can also be used for reliable heat-stable adhesive joints.

Surprisingly, it has been shown that this problem can be solved by the use of an aldimine according to claim 1.

In particular, although this specific cleaning agent composition blocks the reactive polyurethane composition, on the other hand after the cleaning the thus blocked cleaning agent composition becomes active again in a mixed fraction upon hardening of the reactive polyurethane composition by means of moisture, splitting off aldehyde, and it is incorporated into the network of the moisture-hardened polyurethane composition. Such a hardened polyurethane composition has basically the same mechanical properties as if it had not come into contact with the cleaning agent composition prior to the hardening.

In particular, it was found that all the fractions removed from the plant after the cleaning could be mixed with the reactive polyurethane composition and could be fed once again to the manufacturing and processing plants without this negatively influencing the adhesive joints produced with them, especially the thermal stability. Thus, cleaning can be carried out that does not need material to be disposed of. The lack or at least greatly reduced amounts of waste products are especially interesting in terms of economy and ecology.

Further aspects of the invention are the subject of other independent claims. Specially preferred embodiments of the invention are the subject of the dependent claims.

Ways of Implementing the Invention

The present invention concerns, in a first aspect, the use of an aldimine of formula (I) as cleaning agent or as ingredient in a cleaning agent composition for the cleaning of manufacturing and processing plants for reactive polyurethane compositions, especially reactive polyurethane hot melt adhesives.

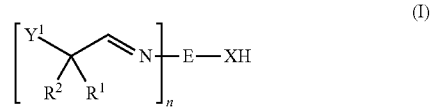

Here:
$R^1$ and $R^2$ either
   independently of each other each stand for a monovalent hydrocarbon residue with 1 to 12 C atoms,
or
   together stand for a divalent hydrocarbon residue with 4 to 12 C atoms that is part of an optionally substituted carbocyclic ring with 5 to 8, preferably 6, C atoms;
Moreover, $Y^1$ stands for a monovalent hydrocarbon residue with 1 to 32 C atoms, which optionally has at least one heteroatom, especially oxygen in the form of ether, carbonyl or ester groups; and
E stands for a (n+1)-valent hydrocarbon residue with 2 to 12 C atoms, which optionally has at least one heteroatom, especially in the form of ether-oxygen or tertiary amine-nitrogen;

X stands for O, S or N—R[8]
where
R[8] either
stands for a monovalent hydrocarbon residue with 1 to 20 C atoms, which optionally has at least one carboxylic acid ester, nitrile, nitro, phosphonic acid ester, sulfonic or sulfonic acid ester group,
or
it stands for a substituent of formula (II)

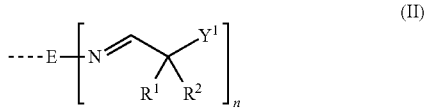

(II)

and n stands for 1, 2 or 3.

By the term "reactive polyurethane composition" is meant in the present document a polyurethane composition which has free isocyanate groups, especially in the form of polyurethane polymers having isocyanate groups. Isocyanate groups are "reactive", that is, they react with water.

The term "polyurethane polymer" comprises all polymers that are made by the so-called diisocyanate polyaddition process. Such polyurethane polymers can also have urea groups in particular, besides urethane or thiourethane groups.

The term "polymer" comprises, in the present document, on the one hand a collection of chemically unified macromolecules, yet differing in terms of degree of polymerization, molar mass and chain length, that has been produced by a polyreaction (polymerization, polyaddition, polycondensation). On the other hand, the term also comprises derivatives of such a collection of macromolecules from polyreactions, i.e., compounds that were obtained by transformations, such as additions or substitutions, of functional groups at given macromolecules and that may be chemically unified or chemically disparate. The term, furthermore, also comprises so-called prepolymers, that is, reactive oligomeric pre-adducts, whose functional groups are involved in the makeup of macromolecules.

Names of substances beginning with "poly", such as polyaldimine, polyamine, polyol or polyisocyanate, in the present document denote substances that formally contain two or more of the functional groups occurring in their name in each molecule.

The broken lines in the formulas in this document each represent the bond between a substituent and the corresponding residue of the molecule.

The term "primary amino group" in the present document denotes an amino group in the form of a $NH_2$ group that is bound to an organic residue. The term "secondary amino group" denotes an amino group in which the nitrogen atom is bound to two organic residues, which can also together be part of a ring. The term "tertiary amino group" denotes an amino group in which the nitrogen atom (=tertiary amine-nitrogen) is bound to three organic residues, while two of these residues can also together be part of a ring.

The term "active hydrogen" denotes in the present document the hydrogen atom of a hydroxyl, a mercapto or a secondary or primary amino group.

An amine and an isocyanate is termed "aliphatic" when its amino and isocyanate groups are bound exclusively to aliphatic, cycloaliphatic or arylaliphatic residues; accordingly, these groups are termed aliphatic amino and isocyanate groups.

An amine and an isocyanate is termed "aromatic" when its amino and isocyanate groups are bound to an aromatic residue; accordingly, these groups are termed aromatic amino and isocyanate groups.

By a "low-odor" substance is meant a substance whose odor is only slightly perceptible by humans, i.e., can be smelled, and thus it does not have an intense smell like, say, formaldehyde, acetaldehyde, isobutyraldehyde, or solvents like acetone, methylethylketone or methylisobutylketone, and this slight smell is not perceived by most persons as being unpleasant or repulsive.

By an "odorless" substance is meant a substance that cannot be smelled by most humans, and thus it has no perceptible odor.

By "room temperature" in the present document is meant a temperature in the range of 20° C. to 25° C.

Preferably, $R^1$ and $R^2$ each stand for a methyl residue.
Preferably n stands for the value 1.
Moreover, $Y^1$ preferably stands for a residue of formula (III a) or (III b).

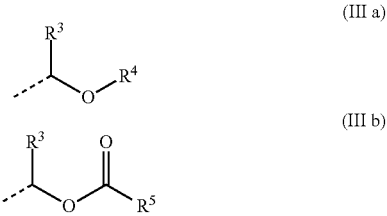

Here, $R^3$ stands for a hydrogen atom or for an alkyl, cycloalkyl, arylalkyl or alkoxycarbonyl residue with 1 to 12 C atoms;
$R^4$ stands for a hydrocarbon residue with 1 to 30 C atoms, which optionally contains ether oxygen-atoms.
Moreover, $R^5$ stands either
for a hydrogen atom,
or
for a linear or branched alkyl residue with 1 to 30 C atoms, optionally with cyclical moieties and optionally with at least one heteroatom, especially oxygen in the form of ether, carbonyl or ester groups,
or
for a monovalent, monounsaturated or polyunsaturated, linear or branched hydrocarbon residue with 5 to 30 C atoms,
or
for an optionally substituted aromatic or heteroaromatic 5 or 6-member ring.

The aldimine of formula (I) can be prepared from at least one sterically hindered aliphatic aldehyde A and at least one aliphatic amine B, corresponding to the formula $[H_2N]_n$-E-XH, which besides one or more primary amino groups also [has] another reactive group, which is a hydroxyl group, a mercapto group, or NH—R[8].

The reaction between the aldehyde A and the amine B occurs in a condensation reaction splitting off water. Such condensation reactions are very well known and described, for example, in Houben-Weyl, "Methoden der organischen Chemie", Vol. XI/2, page 73 et seq. The aldehyde A is used here stoichiometrically in relation to the primary amino groups of the amine B or in stoichiometric excess. Usually, such condensation reactions are carried out in the presence of a solvent, by means of which the nascent water of the reaction is azeotropically removed. However, to prepare the aldimines of formula (I), a method is preferred without solvents, wherein the water formed during the condensation is directly removed from the reaction mixture by application of a vacuum. Thanks to the solvent-free preparation, there is no need to distil the solvent after the preparation is complete, which simplifies the preparation process. Furthermore, the aldimine is thus free of solvent residues, which could cause an unpleasant odor.

For the preparation of the aldimine of formula (I), at least one sterically hindered aliphatic aldehyde A of formula (IV) is used.

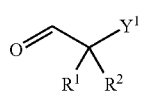
(IV)

The aldehyde A is preferably odorless. By an "odorless" substance is meant a substance that has so little odor that it cannot be smelled by most human beings, that is, it is not perceptible with the nose.

Aldehydes A of formula (IV) are tertiary aliphatic or tertiary cycloaliphatic aldehydes, such as pivalaldehyde (=2,2-dimethyl-propanal), 2,2-dimethyl-butanal, 2,2-diethyl-butanal, 1-methyl-cyclopentane carboxaldehyde, 1-methyl-cyclohexane carboxaldehyde; as well as ethers from 2-hydroxy-2-methylpropanal and alcohols such as propanol, isopropanol, butanol and 2-ethylhexanol; esters from 2-formyl-2-methylpropionic acid or 3-formyl-3-methylbutyric acid and alcohols like propanol, isopropanol, butanol and 2-ethylhexanol; esters from 2-hydroxy-2-methylpropanal and carboxylic acids like butyric acid, isobutyric acid and 2-ethylhexanoic acid; as well as the following descried especially suitable ethers and esters of 2,2-disubstituted 3-hydroxypropanals, -butanals or analogous higher aldehydes, especially of 2,2-dimethyl-3-hydroxypropanal.

Especially suitable aldehydes of formula (IV) in a first embodiment are aldehydes of formula (IV a).

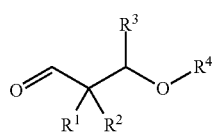
(IV a)

Aldehydes of formula (IV a) constitute ethers of aliphatic, araliphatic or cycloaliphatic 2,2-disubstituted 3-hydroxyaldehydes with alcohols of formula HO—$R^4$, such as fatty alcohols. Suitable 2,2-disubstituted 3-hydroxyaldehydes in turn can be obtained from aldol reactions, especially crossed aldol reactions, between primary or secondary aliphatic aldehydes, especially formaldehyde, and secondary aliphatic, secondary araliphatic or secondary cycloaliphatic aldehydes, such as 2-methylbutyraldehyde, 2-ethylbutyraldehyde, 2-methyl-valeraldehyde, 2-ethylcapronaldehyde, cyclopentane carboxaldehyde, cyclohexane carboxaldehyde, 1,2,3,6-tetrahydrobenzaldehyde, 2-methyl-3-phenylpropionaldehyde, 2-phenylpropionaldehyde (hydratropaldehyde) or diphenylacetaldehyde.

Especially preferred aldehydes of formula (IV a) are 2,2-dimethyl-3-(2-ethylhexyloxy)-propanal, 2,2-dimethyl-3-lauroxy-propanal and 2,2-dimethyl-3-stearoxy-propanal.

In a second embodiment, especially preferred aldehydes of formula (IV) are aldehydes of formula (IV b).

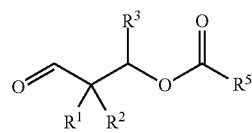
(IV b)

Compounds of formula (IV b) constitute esters of the already described 2,2-disubstituted 3-hydroxyaldehydes, such as 2,2-dimethyl-3-hydroxypropanal, 2-hydroxymethyl-2-methyl-butanal, 2-hydroxymethyl-2-ethyl-butanal, 2-hydroxymethyl-2-methyl-pentanal, 2-hydroxymethyl-2-ethyl-hexanal, 1-hydroxymethyl-cyclopentane carboxaldehyde, 1-hydroxymethyl-cyclohexane-carboxaldehyde 1-hydroxymethyl-cyclohex-3-ene carboxaldehyde, 2-hydroxymethyl-2-methyl-3-phenyl-propanal, 3-hydroxy-2-methyl-2-phenyl-propanal and 3-hydroxy-2,2-diphenyl-propanal, with suitable carboxylic acids $R^5COOH$.

Examples of suitable carboxylic acids $R^5COOH$ are, on the one hand, aliphatic carboxylic acids such as formic acid, acetic acid, propionic acid, butyric acid, isobutyric acid, valeric acid, caproic acid, 2-ethyl-caproic acid, capric acid, lauric acid, tridecanoic acid, myristic acid, pentadecanoic acid, palmitic acid, margaric acid, stearic acid, nonadecanoic acid, arachidic acid, palmitoleic acid, oleic acid, erucic acid, J acid, erucic acid, linoleic acid, linolenic acid, elaeostearic acid, arachidonic acid, fatty acids from the technical saponification of natural oils and fats such as rapeseed oil, sunflower oil, flaxseed oil, olive oil, coconut oil, palm kernel oil and palm oil, as well as technical mixtures of fatty acids that contain such acids. Suitable as carboxylic acids $R^5COOH$ are, on the other hand, aromatic carboxylic acids, such as benzoic acid or the positional isomeric tolyl acids, ethyl- or isopropyl- or tert.-butyl- or methoxy- or nitrobenzoic acids.

Preferred aldehydes of formula (IV b) are 2,2-dimethyl-3-lauroyloxypropanal, 2,2-dimethyl-3-myristoyloxypropanal 2,2-dimethyl-3-palmitoyloxy-propanal, 2,2-dimethyl-3-stearoyloxy-propanal and 2,2-dimethyl-3-benzoyloxy-propanal, as well as analogous esters of other 2,2-disubstituted 3-hydroxyaldehydes.

In an especially preferred embodiment, $R^5$ is chosen from the group consisting of phenyl and the $C_{11}$-, $C_{13}$-, $C_{15}$- and $C_{17}$-alkyl groups.

Especially preferred is 2,2-dimethyl-3-lauroyloxypropanal.

Particularly suited as the amine B of formula $[H_2N]_n$-E-XH are
aliphatic hydroxyamines like 2-aminoethanol, 2-methylaminoethanol, 1-amino-2-propanol, 3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-trimethyl-cyclohexanol; derivatives of glycols bearing a primary amino group such as diethylene glycol, dipropylene glycol, dibutylene glycol and higher oligomers and polymers of these glycols, such as 2-(2-amino-ethoxy)-ethanol, triethylene glycol-monoamine, α-(2-hydroxymethylethyl)-ω-(2-aminomethylethoxy)-poly(oxy(methyl-1,2-ethane diyl)); derivatives of polyalkoxylated trivalent or higher valent alcohols or those of polyalkoxylated diamines bearing a hydroxyl group and one or more primary amino groups; products of the simple cyanoethylation and subsequent hydrogenation of glycols, such as 3-(2-hydroxyethoxy)-propylamine, 3-(2-(2-hydroxyethoxy)-ethoxy)-propylamine, 3-(6-hydroxyhexyloxy)-propylamine;

aliphatic mercaptoamines like 2-aminoethane thiol (cysteamine), 3-aminopropane thiol, 4-amino-1-butane thiol, 6-amino-1-hexane thiol, 8-amino-1-octane thiol, 10-amino-1-decane thiol, 12-amino-1-dodecane thiol; aminothio-sugars like 2-amino-2-deoxy-6-thioglucose;

divalent or polyvalent aliphatic amines, which besides one or more primary amino groups carry a secondary amino group, such as N-methyl-1,2-ethandiamin, N-ethyl-1,2-ethandiamin, N-butyl-1,2-ethandiamin, N-hexyl-1,2-ethane diamine, N-(2-ethylhexyl)-1,2-ethane diamine, N-cyclohexyl-1,2-ethane diamine, 4-aminomethyl-piperidine, 3-(4-aminobutyl)-piperidine, N-aminoethyl-piperazine, diethylene triamine (DETA), bis-hexamethylene triamine (BHMT); di- and triamines from the cyanoethylation or cyanobutylation of primary mono- and diamines, such as N-methyl-1,3-propane diamine, N-ethyl-1,3-propane diamine, N-butyl-1,3-propane diamine, N-hexyl-1,3-propane diamine, N-(2-ethylhexyl)-1,3-propane diamine, N-dodecyl-1,3-propane diamine, N-cyclohexyl-1,3-propane-diamine, 3-methylamino-1-pentylamine, 3-ethylamino-1-pentylamine, 3-butyl-amino-1-pentylamine, 3-hexylamino-1-pentylamine, 3-(2-ethylhexyl)amino-1-pentylamine, 3-dodecylamino-1-pentylamine, 3-cyclohexylamino-1-pentylamine, dipropylene triamine (DPTA), N3-(3-aminopentyl)-1,3-pentane diamine, N5-(3-aminopropyl)-2-methyl-1,5-pentane diamine, N5-(3-amino-1-ethylpropyl)-2-methyl-1,5-pentane diamine, and fatty diamines like N-cocoalkyl-1,3-propane diamine, N-oleyl-1,3-propane diamine, N-soy alkyl-1,3-propane diamine, N-tallow alkyl-1,3-propane diamine or N—($C_{16-22}$-alkyl)-1,3-propane diamine, such as can be obtained for example under the brand names Duomeen® of Akzo Nobel; the products from the Michael-type addition of aliphatic primary di- or polyamines with acrylonitrile, maleic or fumaric acid diesters, citraconic acid diesters, acrylic and methacrylic acid esters and itaconic acid diesters, converted in a molar ratio of 1:1.

Preferred aliphatic hydroxy- and mercaptoamines are those in which the primary amino group of the hydroxyl- or mercapto-group is separated by a chain of at least 5 atoms, or by a ring, such as in 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-trimethyl-cyclohexanol, 2-(2-aminoethoxy)-ethanol, triethylene glycol-monoamine, α-(2-hydroxymethylethyl)-ω-(2-aminomethylethoxy)-poly(oxy-(methyl-1,2-ethandiyl)), 3-(2-hydroxyethoxy)-propylamine, 3-(2-(2-hydroxy-ethoxy)-ethoxy)-propylamine, 3-(6-hydroxyhexyloxy)-propylamine, 6-amino-1-hexane thiol, 8-amino-1-octane thiol, 10-amino-1-decane thiol and 12-amino-1-dodecane thiol hydroxyhexyloxy)-propylamine.

Preferred as amine B of formula $[H_2N]_n$-E-XH are on the one hand divalent or polyvalent aliphatic amines, which besides one or more primary amino groups carry a secondary amino group, especially N-methyl-1,2-ethane diamine, N-ethyl-1,2-ethane diamine, N-cyclohexyl-1,2-ethane diamine, N-methyl-1,3-propane diamine, N-ethyl-1,3-propane diamine, N-butyl-1,3-propane diamine, N-cyclohexyl-1,3-propane diamine, 4-aminomethyl-piperidine, 3-(4-aminobutyl)-piperidine, DETA, DPTA, BHMT and fatty diamines like N-cocoalkyl-1,3-propane diamine, N-oleyl-1,3-propane diamine, N-soy alkyl-1,3-propane diamine and N-tallow alkyl-1,3-propane diamine. Also preferred are aliphatic hydroxy- and mercaptoamines, in which the primary amino group is separated from the hydroxy- or mercapto group by a chain of at least 5 atoms, or by a ring, especially 5-amino-1-pentanol, 6-amino-1-hexanol and higher homologues thereof, 4-(2-aminoethyl)-2-hydroxyethylbenzene, 3-aminomethyl-3,5,5-trimethyl-cyclohexanol, 2-(2-aminoethoxy)-ethanol, triethylene glycol-monoamine and higher oligomers and polymers thereof, 3-(2-hydroxyethoxy)-propylamine, 3-(2-(2-hydroxyethoxy)-ethoxy)-propylamine and 3-(6-hydroxyhexyloxy)-propylamine.

Most preferably the amine B is chosen from the group consisting of bis-hexamethylene triamine (BHMT), N-cyclohexyl-1,2-ethane diamine, N-cyclohexyl-1,3-propane diamine, and 2-(2-aminoethoxy)-ethanol.

The reaction between an aldehyde A and an amine B leads to hydroxyaldimines if a hydroxyamine is used as the amine B; to mercaptoaldimines if a mercaptoamine is used as the amine B; to aminoaldimines if a divalent or polyvalent amine is used as the amine B, which besides one or more primary amino groups carries a secondary amino group.

In one embodiment, the aldimines of formula (I) have a substituent N—$R^8$ as the substituent X. Such aldimines of formula (I) can be prepared by reacting at least one sterically hindered aliphatic aldehyde A of formula (IV) with at least one divalent or polyvalent aliphatic primary amine C of formula $[H_2N]_n$-E-$NH_2$ in a first step to yield an intermediate product of formula (VII), which besides one or more aldimino groups also contains at least one, preferably one, primary amino group; and then reacting this intermediate product in a second step in an addition reaction with a Michael acceptor of formula (VIII) in a ratio of the number of double bonds to the number of $NH_2$ groups=1:1. This yields an aminoaldimine which, besides one or more aldimino groups, also contains at least one, preferably one, secondary amino group.

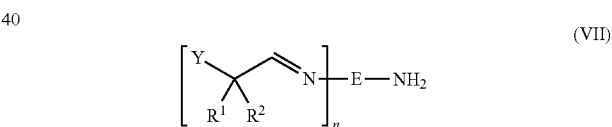

(VII)

(VIII)

(IX)

(IX')

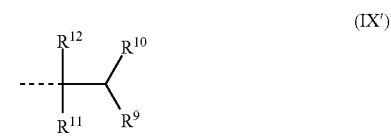

Thus, aldimines of formula (I) are formed, in which X stands for the residue N—$R^8$, and $R^8$ represents a monovalent hydrocarbon residue of formula (IX) or (IX'). In the formulas (VIII), (IX) and (IX'), $R^9$ stands for a residue chosen from the group consisting of —$COOR^{13}$, —CN, —$NO_2$, —$PO(OR^{13})_2$, —$SO_2R^{13}$ and —$SO_2OR^{13}$ and $R^{10}$ stands for a hydrogen atom or a residue from the group consisting of —$R^{13}$, —$COOR^{13}$ and —$CH_2COOR^{13}$ and $R^{11}$ and $R^{12}$ independently of each other stand for a hydrogen atom or a residue from the group consisting of —$R^{13}$, —$COOR^{13}$ and —CN, while $R^{13}$ stands for a monovalent hydrocarbon residue with 1 to 20 C atoms.

The amine C is an aliphatic amine with at least two primary amino groups. The term "aliphatic primary amine" denotes an aliphatic amine in which the amino group is a primary amino group.

Examples of suitable amines C of formula $[H_2N]_n$-E-$NH_2$ are aliphatic polyamines like ethylene diamine, 1,2- and 1,3-propane diamine, 2-methyl-1,2-propane diamine, 2,2-dimethyl-1,3-propane diamine, 1,3- and 1,4-butane diamine, 1,3- and 1,5-pentane diamine, 2-butyl-2-ethyl-1,5-pentane diamine, 1,6-hexamethylene diamine (HMDA), 2,2,4- and 2,4,4-trimethylhexamethylene diamine and mixtures thereof (TMD), 1,7-heptane diamine, 1,8-octane diamine, 2,4-dimethyl-1,8-octane diamine, 4-aminomethyl-1,8-octane diamine, 1,9-nonane diamine, 2-methyl-1,9-nonane diamine, 5-methyl-1,9-nonane diamine, 1,10-decane diamine, isodecane diamine, 1,11-undecane diamine, 1,12-dodecane diamine, methyl-bis-(3-aminopropyl)amine, 1,5-diamino-2-methylpentane (MPMD), 1,3-diaminopentane (DAMP), 2,5-dimethyl-1,6-hexamethylene diamine, cycloaliphatic polyamines like 1,2-, 1,3- and 1,4-diaminocyclohexane, bis-(4-aminocyclohexyl)-methane ($H_{12}$MDA), bis-(4-amino-3-methylcyclohexyl)-methane, bis-(4-amino-3-ethylcyclohexyl)-methane, bis-(4-amino-3,5-dimethylcyclohexyl)-methane, bis-(4-amino-3-ethyl-5-methylcyclohexyl)-methane (M-MECA), 1-amino-3-aminomethyl-3,5,5-trimethylcyclohexane (=isophorone diamine or IPDA), 2- and 4-methyl-1,3-diaminocyclohexane and mixtures thereof, 1,3- and 1,4-bis-(aminomethyl)cyclohexane, 1,3,5-tris-(aminomethyl)cyclohexane, 1-cyclohexylamino-3-aminopropane, 2,5(2,6)-bis-(aminomethyl)-bicyclo[2.2.1]heptane (NBDA, made by Mitsui Chemicals), 3(4),8(9)-bis-(aminomethyl)-tricyclo[5.2.1.0$^{2.6}$]decane, 1,4-diamino-2,2,6-trimethylcyclohexane (TMCDA), 3,9-Bis-(3-aminopropyl)-2,4,8,10-tetraoxaspiro-[5.5]undecane, arylaliphatic polyamines like 1,3-xylylene diamine (MXDA), 1,4-xylylene diamine (PXDA), 1,3,5-tris-(aminomethyl)benzene, aliphatic polyamines containing ether groups like bis-(2-aminoethyl)ether, 4,7-dioxadecane-1,10-diamine, 4,9-dioxadodecane-1,12-diamine and higher oligomers thereof, polyoxyalkylene-polyamines with theoretically two or three amino-groups, available under the name Jeffamine® (made by Huntsman Chemicals). Preferred are di- or triamines in which the primary amino groups are separated by a chain of at least 5 atoms, or by a ring, especially 1,5-diamino-2-methylpentane, 1,6-hexamethylene diamine, 2,2,4- and 2,4,4-trimethylhexamethylene diamine and mixtures thereof, 1,10-decane diamine, 1,12-dodecane diamine, 1,3- and 1,4-diaminocyclohexane, bis-(4-aminocyclohexyl)-methane, bis-(4-amino-3-methylcyclohexyl)-methane, 1-amino-3-aminomethyl-3,5,5-trimethylcyclohexane, 1,3- and 1,4-bis-(aminomethyl)cyclohexane, 2,5(2,6)-bis-(aminomethyl)-bicyclo[2.2.1]heptane, 3(4),8(9)-bis-(aminomethyl)-tricyclo[5.2.1.0$^{2.6}$]decane, 1,4-diamino-2,2,6-trimethylcyclohexane (TMCDA), 3,9-bis-(3-aminopropyl)-2,4,8,10-tetraoxaspiro [5.5]undecane, 1,3- and 1,4-xylylene diamine, 1,3,5-tris-(aminomethyl)benzene and polyoxyalkylene-polyamines with theoretically two or three amino groups, available under the name Jeffamine® (made by Huntsman Chemicals).

Examples of suitable Michael acceptors of formula (VIII) are maleic or fumaric acid diesters like dimethylmaleinate, diethylmaleinate, dibutyl-maleinate, diethylfumarate; citraconic acid diesters like dimethylcitraconate; acrylic or methacrylic acid esters like methyl(meth)acrylate, ethyl(meth)acrylate, butyl(meth)acrylate, lauryl(meth)acrylate, stearyl (meth)acrylate, tetrahydrofuryl(meth)acrylate, isobornyl (meth)acrylate; itaconic acid diesters like dimethylitaconate; cinnamic acid esters like methylcinnamate; vinylphosphonic acid diesters like dimethyl vinyl-phosphonate; vinylsulfonic acid esters, especially vinylsulfonic acid aryl esters; vinylsulfones; vinylnitriles like acrylonitrile, 2-pentene nitrile or fumaronitrile; 1-nitroethylenes like β-nitrostyrene; and Knoevenagel condensation products, such as those from malonic acid diesters and aldehydes like formaldehyde, acetaldehyde or benzaldehyde. Preferred are maleic acid diesters, acrylic acid esters, and vinylnitriles.

The reaction of the aldehyde A with the amine C to yield the intermediate product of formula (VII) occurs in a condensation reaction with splitting off of water, as described above for the reaction of the aldehyde A with the amine B. The stoichiometry between the aldehyde A and the amine C is chosen so that for each mole of aldehyde A at least 1 mole of amine C is used. A solvent-free preparation method is preferred, wherein the water formed during the condensation is removed from the reaction mixture by application of vacuum.

The reaction of the intermediate product of formula (VII) with the Michael acceptor of formula (VIII) occurs, for example, in that the intermediate product is mixed with a stoichiometric or slightly above stoichiometric quantity of the Michael acceptor of formula (VIII) and the mixture is heated at temperatures of 20 to 110° C. until the intermediate product is fully reacted to the aldimine of formula (I). The reaction occurs preferably without the use of solvents.

$R^3$ stands preferably for H.

The substituent E preferably has 3 to 6 C atoms.

Preferred aldimines of formula (I) are low-odor. Especially preferred aldimines of formula (I) are odorless.

In one preferred embodiment, $Y^1$ stands for the residue of formula (III a) and $R^4$ for a linear or branched alkyl residue with 6 to 30, especially with 11 to 30, C atoms.

In an especially preferred embodiment, $Y^1$ stands for the residue of formula (III b) and $R^5$ for a linear or branched alkyl residue with 6 to 30, especially with 11 to 30, C atoms.

Especially preferred aldimines of formula (I) have the structure of formula (III b-1) or (III b-2) or (III b-3) or (III b-4).

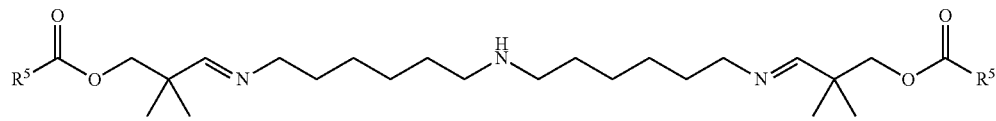

(III b-1)

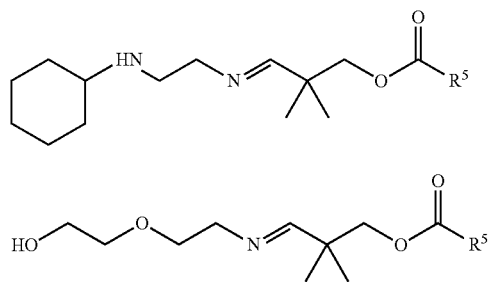
(III b-2)

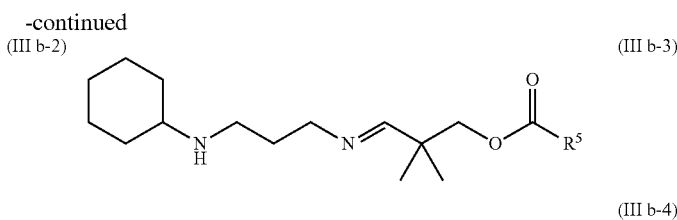
(III b-3)

(III b-4)

The above described aldimine of formula (I) can be used alone as cleaning agent or as an ingredient of a cleaning agent composition for reactive polyurethane compositions.

Reactive polyurethane compositions have reactive NCO groups. The XH group reacts with the isocyanate groups of the reactive polyurethane compositions, i.e., the NCO groups become blocked, so that the thus blocked polyurethane compositions have no free NCO groups.

In this connection, it is important to stress that it is essential to the present invention that the aldimine of formula (I) has only one XH group. In fact, if several XH groups were present, a cross linking would occur in such a reaction with the isocyanate groups and a cleaning would no longer be possible, but instead a kind of gluing or hardening would occur, as is formed in the reaction of the reactive polyurethane compositions (without use of a cleaning composition) in contact with moisture.

Due to this blocking reaction of the polyurethane polymers having isocyanate group, especially isocyanate groups, of the reactive polyurethane compositions, by the aldimine of formula (I), the polyurethane compositions so blocked have aldimine groups.

Thus, a cleaning agent composition for the cleaning of manufacturing and processing plants for reactive polyurethane compositions, especially reactive polyurethane hot melt adhesives, is another aspect of the present invention.

Such a cleaning agent composition contains, in particular
- at least one aldimine of formula (I), as has been described above; and
- at least one carrier A, which carries no functional groups that are reactive to isocyanate.

By a "carrier" in the sense of this document is meant polymers that are thermoplastic and that can take up the compound B essentially homogeneously.

It is important that the carrier A has no isocyanate-reactive groups, in order to prevent the carrier A from having a cross linking effect upon contact with the reactive polyurethane composition.

The most diverse materials can be considered as the carrier A, but the carrier A must be thermoplastic and must not have any isocyanate-reactive groups. Furthermore, the carrier A should advantageously have viscosity comparable to the reactive polyurethane hot melt adhesive being supplanted at the application temperature.

A suitable nonreactive carrier A is, in particular, a blocked polyurethane prepolymer, a hydrocarbon resin, a blocked polyester, a blocked polyol or a copolymer of at least one of the monomers that are chosen from the group consisting of ethylene, propylene, butylene, butadiene, vinyl esters, vinyl chloride, styrene, esters of acrylic acid and esters of methacrylic acid.

Possible nonreactive polyurethanes are, for example, stoichiometrically blocked polyurethane prepolymers that are made inert with a blocking agent.

On the one hand, polyurethane prepolymers having isocyanate groups can be blocked with blocking agents like ε-caprolactam or monofunctional alcohols or amines or mercaptans. On the other hand, polyurethane prepolymers having OH groups can be blocked by monofunctional isocyanates, especially p-tosyl isocyanate.

In one preferred embodiment, a nonreactive polyurethane is used that consists of the reactive polyurethane hot melt adhesive being supplanted, whose reactive isocyanate groups have been blocked with a monofunctional alcohol, amine, mercaptan, amide or imide.

In an especially suitable embodiment, the carrier is the reaction product, free of isocyanate groups, of the above described aldehyde of formula (I) and polyurethane prepolymer having isocyanate groups, especially the one of the reactive polyurethane composition being cleaned. Such a reaction product free of isocyanate groups is preferably carried out with a stoichiometric OH/NCO excess of aldehyde of formula (I). Thus, it is advantageous for a certain residual amount of unreacted aldehyde of formula (I) to still be present.

As blocked polyols one can especially consider basically totally etherized polyols. The polyol skeleton of this etherized polyol is chosen in particular from the group comprising polyether polyols, polyester polyols, polycaprolactone polyols. In particular, these are dialkoxypolyalkoxydiols, preferably dimethoxypolyethylene glycols or dimethoxypolypropylene glycols, or alkoxy-polyester polyols. The etherized polyester polyols in particular have neither free hydroxy groups nor free carboxyl groups.

On the other hand, especially suitable as blocked polyols are polyester polyols, polycarbonate polyols, polyhydroxy-terminated polybutadiene polyols, polyether polyols, especially polyoxyalkylene polyols, which are stoichiometrically blocked with a monofunctional isocyanate compound, so that neither free hydroxy groups nor free carboxyl groups are present.

It should be noted, for the mentioned blocked carriers, that the blocking agent should not become unblocked in substantial fractions at the application temperature of the cleaning agent composition.

Furthermore, colophony, hydrocarbon resins, hydrogenated or nonhydrogenated terpene resins and petroleum resins are suitable as the carrier A.

Suitable homo- or copolymers are thermoplastic homo- or copolymers, especially those which are prepared from the polymerization of monomers that have C=C double bonds, especially at least one monomer chosen from the group consisting of ethylene, propylene, butylene, butadiene, vinyl esters, vinyl chloride, styrene, esters of acrylic acid and esters of methacrylic acid. Copolymers of ethylene and vinyl ester are preferred, especially ethylene/vinyl acetate (EVA) copolymers.

Ethylene/vinyl acetate copolymers have proven to be especially suitable as carriers. As compared to blocked polyurethane prepolymers, ethylene/vinyl acetate copolymers are distinguished primarily by low price and broad commercial availability. Contrary to the professional opinion, as expressed for example in EP 0 544 058 A2, it has been found that EVA mixes very well with polyurethane adhesives and therefore is suitable for use as a carrier of a cleaning agent composition.

The carrier A preferably has a glass transition temperature ($T_g$) that is lower than the application temperature of the cleaning agent composition.

The carrier A is chosen in particular such that the polarity of the carrier A is attuned to that of the hot melt adhesive being supplanted. Since polyurethane hot melt adhesives preferably have a polar nature, this means that polar carriers A are especially preferred.

Depending on the fraction of the carrier A in the cleaning agent composition and the quantity of the cleaning agent composition used for the cleaning, however, it may be necessary in some circumstances to dispose of a small fraction of the mixed fractions on account of the carrier A.

Especially in these cases it is advantageous for the cleaning agent composition to also include a colorant or a pigment. Colorants that are dissolved in the carrier A are used preferably. Such a colorant enables a better visual judgment as to whether and how much of the mixed fraction needs to be disposed of.

Furthermore, it is advantageous for the cleaning agent composition to also contain a colorant or a pigment to easily determine in visual manner when the process of blocking of the reactive polyurethane composition by the cleaning agent composition is concluded.

In order to utilize the benefits of the present invention as much as possible, namely, to dispose of the least material possible, it is therefore desirable for the fraction of the carrier A to not be too high. It has been found that the fraction of the carrier A is advantageously not more than 50 wt. %, especially between 5 and 30 wt. %, in regard to the cleaning agent composition.

It is therefore especially advantageous when only the aldimine of the formula is used alone as the cleaning agent.

Furthermore, it has been shown to be advantageous for the cleaning agent composition to contain moreover at least one catalyst for the reaction of the HX group with isocyanate, especially an organotin compound and/or a bismuth compound and/or a tertiary amine.

Such organotin compounds are very familiar to the professional, such as dibutyltin diacetate, dibutyltin dilaurate, dibutyltin dichloride, dibutyltin diacetylacetonate or dioctyltin dilaurate.

Such bismuth compounds are known to the professional, such as bismuth trioctoate or bismuth tris(neodecanoate).

Such tertiary amines that can be used as catalysts are, in particular, 2,2'-dimorpholinodiethylether and 1,4-diazabicyclo[2.2.2]octane.

The cleaning agent composition if necessary can moreover contain fillers. However, in order to prevent damage to the plants and equipment, as a rule these fillers should not be abrasive. Cleaning agent compositions are preferred that do not contain any fillers.

The cleaning agent composition can when necessary contain additional ingredients, such as softeners, stabilizers, especially heat stabilizers, surface active agents such as surfactants, as occur in conventional cleaning agents.

When making use of softeners, however, limits are imposed. In event of high content or certain types there is the disadvantage that, due to migration effects, a cleaning agent composition containing a softener becomes greasy during storage and therefore difficult to handle.

The optional ingredients of the cleaning agent composition should therefore be selected so that they have no functional groups that react with isocyanates, especially at the cleaning temperature.

The above described aldimine of formula (I) or the above described cleaning agent composition is especially well suited to cleaning of manufacturing and processing plants for reactive polyurethane compositions, especially reactive polyurethane hot melt adhesives Another aspect of the present invention therefore concerns a method for the cleaning of a manufacturing or application plant or an application device for reactive polyurethane compositions.

In this method, an above described aldimine of formula (I) or a cleaning agent composition, as was described above, is added to a reactive polyurethane composition present in this plant or device and it is expelled from the plant or device.

Basically, the invention can pertain to any reactive polyurethane composition as long as it contains isocyanate groups.

These reactive polyurethane compositions are especially usable as adhesives or sealants or casting compound or coating.

In particular, they are single-component reactive polyurethane compositions based on polyurethane polymers having isocyanate groups. Such polyurethane polymers having isocyanate groups are prepared in known manner from polyols and polyisocyanates.

The present invention is important, on the one hand, for single-component reactive polyurethane sealants or adhesives based on polyurethane polymers having isocyanate groups that are applied at room temperature and harden with the humidity of air. Such sealants or adhesives are available, for example, under the brand names Sikaflex® or SikaTack® from Sika Schweiz AG.

On the other hand, the present invention is especially important for single-component reactive polyurethane adhesives based on polyurethane polymers having isocyanate groups that are applied at higher temperature and harden with the humidity of air. Such adhesives are also known as warm melt polyurethane adhesives (application temperature 50° to 80° C.) or reactive polyurethane hot melt adhesives (reactive polyurethane hotmelts) (application temperature greater than 80° C.).

Reactive polyurethane hot melt adhesives (reactive polyurethane hotmelts) are the most preferred reactive polyurethane compositions here. Such reactive polyurethane hot melt adhesives are available, for example, from Sika Automotive GmbH, Germany, under the brand name SikaMelt®.

The aldehyde of formula (I), or the cleaning agent composition, must be stable at least for the cleaning time at temperatures to which it is exposed during the cleaning. It is desirable that the aldehyde or the cleaning agent composition can stay at least several hours, especially days, at the cleaning temperature without the aldehyde or the cleaning agent composition becoming decomposed or broken down in substantial fractions.

The aldehyde or the cleaning agent composition is advantageously as free as possible of water or moisture. One should therefore use raw materials during the production that are as dry or dried as possible and refrain from using ingredients that take up water from the surroundings.

Such a cleaning agent is extremely efficient, cost-effective, and extremely advantageous in terms of ecology and work hygiene.

At the end of the production, the cleaning agent composition can be placed in the proper form required for the application. For the cleaning of hot melt adhesives, a solid form is advantageous. For example, it can be present in the form of granulate, flakes, or a block. It is converted into this form in familiar fashion and this can be done directly from the melt or during or after the cooldown. Advantageously, the cleaning agent composition is converted from the melt to the application form directly after being prepared. In selecting this form of presence, it is advantageous to select a form that enables a dispensing of the cleaning agent composition even after a lengthy storage time.

One should also pay heed that the packaging used for the aldehyde or the cleaning agent composition offers adequate protection and especially is impermeable to moisture.

The adding to the plant being cleaned or the device being cleaned should occur in solid form or in the form of a melt, especially for hot melt adhesives. It is preferable for the cleaning agent composition to be present in the form of granules or flakes. The cleaning temperature is usually the processing temperature of the reactive polyurethane hot melt adhesive, typically 80 to 180° C., especially 90 to 150° C. However, it can be advantageous to carry out the cleaning at higher temperature, so that the reactive polyurethane hot melt adhesive being supplanted becomes less viscous. There are system-related upper limits here due to the decomposition temperature of the polyurethane hot melt adhesives or the cleaning agent composition, which must not be exceeded under any circumstances.

For the cleaning of reactive polyurethane adhesives or sealants that are applied at room temperature, the adding and cleaning is advantageously done at room temperature.

A cleaning of a plant or a device is typically done as described below for a cleaning agent composition. Of course, the corresponding also holds for a cleaning by means of an aldehyde of formula (I):

The adding of a reactive polyurethane composition is interrupted and the cleaning agent composition is added to the plant or the device. After this, the delivery was continued with the delivery system of the polyurethane composition until it is assured that no more reactive polyurethane composition is present at the exit from the plant or the device. This moment of time after the adding of the cleaning agent composition depends on many factors, especially the cleaning temperature, the content of free isocyanate groups of the reactive polyurethane composition, the dimensions and geometry of the plant or device being cleaned, and the concentration of the aldehyde of formula (I) in the cleaning agent composition.

This time can either be determined visually, if the cleaning agent composition contains a suitably chosen colorant or pigment. On the other hand, this time can be determined by infrared absorption or transmission spectroscopy, namely, when the IR band characteristic of the NCO group (2270 $cm^{-1}$) has vanished. However, it is also quite possible to use a time for reliable blocking that was determined in advance for a plant and the particular specific reactive polyurethane composition in combination with fixed plant parameters.

The plant so cleaned or the device so cleaned can be left unused for a lengthy period of time with no problems.

When the plant or the device is again loaded with (new) reactive polyurethane composition, the work can simply go forward once again. All that needs to be done is to remove a small quantity in the beginning after the plant is started up until it is assured that a sufficiently large amount of non-blocked reactive polyurethane composition is present. Experience shows that a reliably usable mixed fraction should have at most 30 wt. % of polyurethane polymers blocked with aldimine of formula (I). However, it is a major benefit of the present invention that this removed quantity of reactive polyurethane composition can be mixed in with no problem before being fed to the plant, so that in fact there is no waste product thanks to this recycling.

The aldehyde of formula (I) and the cleaning agent composition is especially suitable for the cleaning of processing equipment as well as application devices, especially applicator appliances for reactive polyurethane hot melt adhesives. Typically, these plants and devices have narrow areas, such as slots or nozzles, moving parts like worms, rolls, agitators, vanes, pumps, or also hoses and pipes, which can only be cleaned manually with great cost and labor expense. With the invented aldehyde of formula (I) and cleaning agent composition, a thorough yet sparing and fast cleaning of these plants and devices can be done by removing the reactive polyurethane composition from them.

Of course, such cleaning agent compositions can also be used for the cleaning of plants in which reactive polyurethane compositions are produced.

EXAMPLES

The examples serve to illustrate the invention and are in no way to be considered as limiting the invention.

Description of the Measurement Methods

The infrared spectra were measured on a FT-IR 1600 from Perkin-Elmer (horizontal ATR measuring unit with ZnSe crystal); the samples were applied undiluted as films. The absorption bands are indicated in wave numbers ($cm^{-1}$) (measurement window: 4000-650 $cm^{-1}$).

$^1$H-NMR-spectra were measured on a spectrometer of type Bruker DPX-300 at 300.13 MHz; the chemical shifts δ are indicated in ppm relative to tetramethylsilane (TMS), coupling constants J are indicated in Hz. The coupling patterns (t, m) were indicated even when only pseudocoupling patterns are involved.

The viscosity was measured on a thermostatically controlled cone-plate viscosimeter Physica UM (cone diameter 20 mm, cone angle 1°, cone vertex to plate distance 0.05 mm, shear rate 10 to 1000 $s^{-1}$).

The total content of aldimino groups and free amino groups in the prepared compounds ("amine content") was determined by titration (with 0.1N $HClO_4$ in glacial acetic acid, against crystal violet) and is always indicated in mmol $NH_2$/g (even when only primary amino groups are at hand).

Preparation of Sample Aldehydes

Aldimine AL1

In a round-bottom flask, under nitrogen atmosphere, 30.13 g (0.106 mol) of 2,2-dimethyl-3-lauroyloxy-propanal was placed. Under vigorous stirring, 15.00 g (0.096 mol) of N-cyclohexyl-1,3-propane diamine was added in the space of 5 minutes from a drip funnel, whereupon the temperature of the reaction mixture rose to 36° C. After this, the volatile components were removed in vacuum (10 mbar, 80° C.). One gets 43.2 g of a colorless, clear and odorless liquid, highly fluid at room temperature, having an amine content of 4.39 mmol $NH_2$/g. The product is mostly present in the open-chain (aldimine) form.

IR: 3308 (N—H), 2921, 2851, 2659, 1737 (C═O), 1668 (C═N), 1465, 1449, 1418 sh, 1393, 1366, 1346, 1301, 1248, 1158, 1111, 1068, 1020, 1002, 938, 888, 845, 797, 721.

$^1$H-NMR (CDCl$_3$, 300K): δ 7.53 (s, 1H, CH=N), 4.01 (s, 2H, CH$_2$O), 3.43 (t, 2H, CH=NCH$_2$CH$_2$), 2.65 (t, 2H, NHCH$_2$), 2.40 (s, 1H, Cy-C$^1$HNH), 2.29 (t, 2H, CH$_2$CO), 1.86 (m, 2H, 2 Cy-H), 1.72 (m, 4H, 2 Cy-H and CH=NCH$_2$CH$_2$), 1.60 (m, 3H, CH$_2$CH$_2$CO and CH$_3$NHCH$_2$), 1.26 (m, 22H, CH$_3$—(CH$_2$)$_8$—CH$_2$CH$_2$CO and 6 Cy-H), 1.09 (s, 6H, C(CH$_3$)$_2$—CH$_2$O), 0.88 (t, 3H, CH$_3$—(CH$_2$)$_{10}$—CO).

Aldimine AL2

In a round-bottom flask, under nitrogen atmosphere, 34.15 g (0.120 mol) of 2,2-dimethyl-3-lauroyloxy-propanal was placed. Under vigorous stirring, 12.02 g (0.056 mol) of bis-hexamethylene triamine (BHMT-HP; Invista) was added in the space of 5 minutes from a drip funnel, whereupon the temperature of the reaction mixture rose to 35° C. After this, the volatile components were removed in vacuum (10 mbar, 80° C.). One gets 43.6 g of a colorless, clear and odorless liquid, highly fluid at room temperature, having an amine content of 3.68 mmol NH$_2$/g. The product is mostly present in the open-chain (aldimine) form.

IR: 2922, 2851, 1737 (C=O), 1668 (C=N), 1465, 1417, 1393, 1373, 1340, 1248, 1234, 1159, 1111, 1020, 1003, 933, 870, 722.

$^1$H-NMR (CDCl$_3$, 300K): δ 7.52 (s, 2H, CH=N), 4.02 (s, 4H, CH$_2$O), 3.36 (t, 4H, CH=NCH$_2$CH$_2$), 2.59 (t, 4H, NHCH$_2$), 2.29 (t, 4H, CH$_2$CO), 1.76-1.51 (m, 13H, CH=NCH$_2$CH$_2$, NHCH$_2$CH$_2$, CH$_2$CH$_2$CO and CH$_2$NHCH$_2$), 1.27 (m, 40H, CH$_2$—(CH$_2$)$_8$—CH$_2$CH$_2$CO and NHCH$_2$CH$_2$CH$_2$), 1.10 (s, 12H, C(CH$_3$)$_2$—CH$_2$O), 0.88 (t, 6H, CH$_3$—(CH$_2$)$_{10}$—CO).

Aldimine AL3

In a round-bottom flask, under nitrogen atmosphere, 28.06 g (0.099 mol) of 2,2-dimethyl-3-lauroyloxy-propanal was placed. Under vigorous stirring, 10.00 g (0.095 mol) of 2-(2-aminoethoxy)-ethanol (Diglycolamine® Agent; Huntsman) was added in the space of 3 minutes from a drip funnel, whereupon the temperature of the reaction mixture rose to 40° C. After this, the volatile components were removed in vacuum (10 mbar, 80° C.). One gets 36.3 g of a colorless, clear and odorless liquid, highly fluid at room temperature, having an amine content of 2.58 mmol NH$_2$/g. The product is mostly present in the open-chain (aldimine) form.

IR: 3435 br (O—H), 2954 sh, 2922, 2852, 1736 (C=O), 1668 (C=N), 1466, 1418, 1394, 1375, 1248, 1233, 1160, 1127, 1062, 1022, 933, 893, 813, 721.

$^1$H-NMR (CDCl$_3$, 300K): δ 7.59 (s, 1H, CH=N), 4.03 (s, 2H, CH$_2$O), 3.71 (m, 4H, HOCH$_2$CH$_2$OCH$_2$CH$_2$N), 3.58 (m, 4H, HOCH$_2$CH$_2$OCH$_2$CH$_2$N), 2.44 (br s, 1H, HOCH$_2$), 2.30 (t, 2H, CH$_2$CO), 1.61 (m, 2H, CH$_2$CH$_2$CO), 1.26 (m, 16H, CH$_3$—(CH$_2$)$_8$—CH$_2$CH$_2$CO), 1.11 (s, 6H, C(CH$_3$)$_2$—CH$_2$O), 0.88 (t, 3H, CH$_3$—(CH$_2$)$_{10}$—CO).

The 2,2-dimethyl-3-lauroyloxy-propanal used for the preparation of the aldimines AL1, AL2 and AL3 was prepared according to example 1 of WO 2004/013088 A1.

Preparation of a Sample Reactive Polyurethane Composition

A sample reactive polyurethane hot melt adhesive K1 was prepared as follows:

800 g of Dynacoll 7150 (Evonik, amorphous solid polyester saturated at room temperature, T$_g$ (DSC)=50° C., 38-46 mg KOH/g) was melted with 800 g of Dynacoll 7250 (Evonik, liquid, saturated polyester at room temperature, T$_g$ (DSC)=−50° C., OH-number 18-24 mg KOH/g) under nitrogen and agitation in a stirred vessel with an anchor agitator under vacuum. After 2 hours of stirring at 130° C., 233 g of Desmodur 44 MC Flakes (Bayer, 4,4'-diphenylmethane diisocyanate (4,4'-MDI)) were then added under stirring.

After 1 hour of stirring, hot melt adhesive was poured out. The adhesive has a NCO content of 2.2%.

Application

For each of the experiments, we proceeded as follows:

The above described reactive hot melt adhesive K1 was applied by a roller system ICO WLA 1600 (ICO System, Germany). A graphitized roller, a gap less than 1 mm, and adhesive temperature of 145° C. was used. The rate of application was 6 m/min. The turning speed of the doctor roll was 0.6 m/min.

After the roller system was running for 30 minutes, the adhesive emerging from the roller was used to make 3 shear tension samples (Ref. 1) or ("before cleaning").

The shear tension samples were made with the help of a mold: the adhesive was applied to a slab of dried beech wood (100 mm×25 mm×5 mm), pressed into the shear tension sample geometry with the help of an appropriate mold using a second such beech wood slab to a layer thickness of 1 mm and 20 mm overlap, and hardened for 7 days at 23° C. and 50% relative humidity.

Now the feeding of the adhesive K1 was temporarily interrupted and 200 g of the particular aldimine or alcohol per kg of adhesive per table 1 was feed to the roll gap as cleaning agent. Samples were taken continuously to investigate the disappearance of the isocyanate groups by IR. As soon as no more isocyanate groups could be detected, it was certain that now only blocked adhesive was present on the roll. The feeding of adhesive K1 was now continued once more until the intensity of the NCO bands in the IR measurement had 50% of the original intensity, so that it was certain that now a mixture of blocked and nonblocked adhesive K1 was delivered. With the adhesive now emerging from the roll, another 3 shear tension samples ("mixed fraction") were prepared. After this, the delivery of the adhesive K1 was resumed until the intensity of the bands had again reached the original value, so that it was certain that now only nonblocked adhesive K1 was present in the system. With the adhesive now emerging from the roll, another 3 shear tension samples were prepared ("after cleaning").

The shear tension samples after the hardening (7 d, 23° C. and 50% relative humidity) were placed in a vertical position, fixed, and a weight was hung from the lower wooden slab (static loading 10 N) and placed in a circulating air furnace controlled to 170° C. After 1 hour, we checked to see whether shear tension samples were intact ("OK") or disrupted ("not") and entered this in table 1.

TABLE 1

| Cleaning agents and results. | | | | | |
|---|---|---|---|---|---|
| | Ref. 1 | Ref. 2 | 1 | 2 | 3 |
| Cleaning agent | | | | | |
| AL1 [g/kg adhesive] | | | 200 | | |
| AL2 [g/kg adhesive] | | | | 200 | |
| AL3 [g/kg adhesive] | | | | | 200 |
| Stearyl alcohol [g/kg adhesive] | | 200 | | | |
| Load test (before cleaning) | OK | OK | OK | OK | OK |
| Load test (mix fraction) | | no | OK | OK | OK |
| Load test (after cleaning) | | OK | OK | OK | OK |

It can be seen from table 1 that the adhesives before and after cleaning (Ref. 1) have a flawless adhesion and good mechanics. In the mixed fractions combined [with] adhesives blocked by the cleaning agent, on the other hand, it was found that in the case of blocking with stearyl alcohol (a blocking agent that is used in cleaning agents of the prior art) (Ref. 2), adhesive joints result that have weaknesses in thermal stability, while this is not the case for examples 1, 2 and 3.

Thus, in examples 1, 2 and 3 mixed fractions of blocked and nonblocked adhesives can also be used to produce dependable adhesive joints, while this is not the case for the comparison cleaning agent Ref. 2.

Use of Cleaning Agents for Cleaning

In a further experiment with the above described roller system, encrustations were found after continuous operation with the reactive hot melt adhesive K1 on the rolls in particular and on the rims and the doctor rolls. After loading the plant—as described above—with cleaning agent AL1 the contaminants were spontaneously removed. On occasion, further wiping with a rag was necessary.

After the absence of NCO groups was confirmed in the adhesive emerging from the rolls—as described above—one could easily shut down a roller system so cleaned over the weekend and then place it back in operation on Monday without any problems. Not even a trace of hardened or encrusted adhesive was ever found.

Similar behavior was found with the cleaning agents AL2 and AL3. If no cleaning agent was used, the encrustations and adhesive deposits on the rolls were so great that the plant could no longer be placed in operation after the weekend, but instead a labor-intensive overhauling and intense and costly cleaning was needed.

The invention claimed is:

1. A method comprising:
cleaning manufacturing or processing plants for reactive polyurethane compositions with a cleaning agent or cleaning agent composition comprising an aldimine of Formula (I):

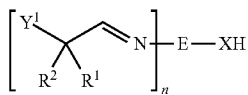

(I)

where:
R$^1$ and R$^2$ either:
independently of each other each stand for a monovalent hydrocarbon residue with 1 to 12 C atoms, or
together stand for a divalent hydrocarbon residue with 4 to 12 C atoms that is part of an optionally substituted carbocyclic ring with 5 to 8 C atoms;
Y$^1$ stands for a monovalent hydrocarbon residue with 1 to 32 C atoms, which optionally has at least one heteroatom,
E stands for a (n+1)-valent hydrocarbon residue with 2 to 12 C atoms, which optionally has at least one heteroatom;
X stands for O, S or N—R$^8$
where:
R$^8$ either:
stands for a monovalent hydrocarbon residue with 1 to 20 C atoms, which optionally has at least one carboxylic acid ester, nitrile, nitro, phosphonic acid ester, sulfonic or sulfonic acid ester group, or
stands for a substituent of formula (II):

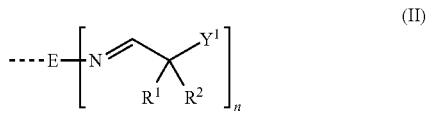

(II)

where n stands for 1, 2 or 3.

2. The method of claim 1, wherein R$^1$ and R$^2$ each stand for a methyl residue.

3. The method of claim 1, wherein Y$^1$ stands for a residue of formula (III a) or (III b):

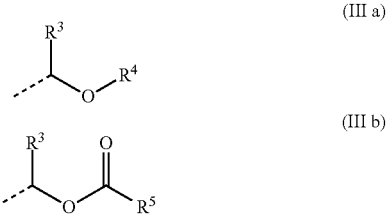

where:
R$^3$ stands for a hydrogen atom or for an alkyl, cycloalkyl, arylalkyl or alkoxycarbonyl residue with 1 to 12 C atoms;
R$^4$ stands for a hydrocarbon residue with 1 to 30 C atoms, which optionally contains ether oxygen-atoms;
R$^5$ stands either:
for a hydrogen atom, or
for a linear or branched alkyl residue with 1 to 30 C atoms, optionally with cyclical moieties and optionally with at least one heteroatom, or
for a monovalent, monounsaturated or polyunsaturated, linear or branched hydrocarbon residue with 5 to 30 C atoms, or
for an optionally substituted aromatic or heteroaromatic 5 or 6-member ring.

4. The method of claim 3, wherein Y$^1$ stands for the residue of formula (III a) and R$^4$ for a linear or branched alkyl residue with 6 to 30 C atoms.

5. The method of claim 3, wherein Y$^1$ stands for the residue of formula (III b) and R$^5$ for a linear or branched alkyl residue with 6 to 30 C atoms.

6. The method of claim 3, wherein R$^3$ stands for H.

7. The method of claim 1, wherein the substituent E has 3 to 6 C atoms.

8. The method of claim 1, wherein the aldimine of formula (I) has the structure of formula (III b-1) or (III b-2) or (III b-3) or (III b-4):

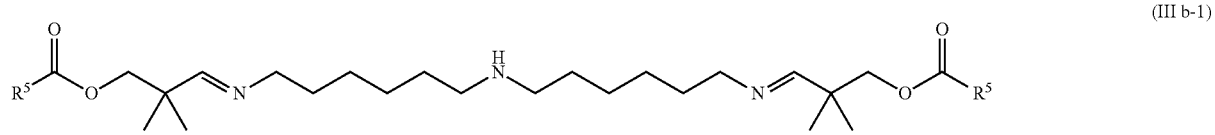

(III b-1)

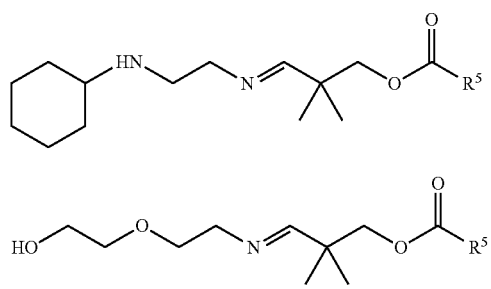
(III b-2)

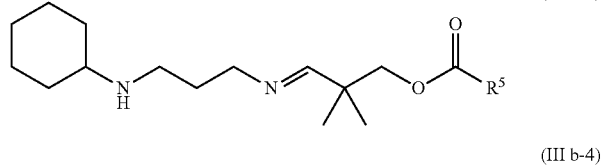
(III b-3)

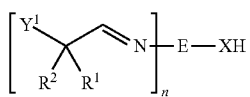
(III b-4)

where R⁵ stands either:
for a hydrogen atom, or
for a linear or branched alkyl residue with 1 to 30 C atoms, optionally with cyclical moieties and optionally with at least one heteroatom, or
for a monovalent, monounsaturated or polyunsaturated, linear or branched hydrocarbon residue with 5 to 30 C atoms, or
for an optionally substituted aromatic or heteroaromatic 5 or 6-member ring.

9. The method of claim 1, wherein n is 1.

10. A method for cleaning a manufacturing or application plant or an application device for reactive polyurethane compositions, the method comprising:
adding to a reactive polyurethane composition present in the plant or device a cleaning agent composition comprising:
at least one carrier A, which carries no functional groups that are reactive to isocyanate; and
at least one aldimine of formula (I):

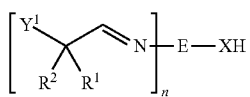
(I)

where:
R¹ and R² either:
independently of each other each stand for a monovalent hydrocarbon residue with 1 to 12 C atoms, or
together stand for a divalent hydrocarbon residue with 4 to 12 C atoms that is part of an optionally substituted carbocyclic ring with 5 to 8 C atoms;
Y¹ stands for a monovalent hydrocarbon residue with 1 to 32 C atoms, which optionally has at least one heteroatom;
E stands for a (n+1)-valent hydrocarbon residue with 2 to 12 C atoms, which optionally has at least one heteroatom;
X stands for O, S or N—R⁸, where:
R⁸ either:
stands for a monovalent hydrocarbon residue with 1 to 20 C atoms, which optionally has at least one carboxylic acid ester, nitrile, nitro, phosphonic acid ester, sulfonic or sulfonic acid ester group, or
stands for a substituent of formula (II):

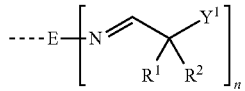
(II)

where n stands for 1, 2 or 3; and
expelling the resulting composition from the plant or device.

11. The method of claim 10, wherein the reactive polyurethane composition is a reactive polyurethane hot melt adhesive.

* * * * *